(12) United States Patent
Kimura

(10) Patent No.: US 7,927,203 B2
(45) Date of Patent: Apr. 19, 2011

(54) GAME DEVICE, GAME CONTROL METHOD AND INFORMATION STORAGE MEDIUM

(75) Inventor: Seitaro Kimura, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1205 days.

(21) Appl. No.: 10/944,846

(22) Filed: Sep. 21, 2004

(65) Prior Publication Data

US 2005/0070349 A1    Mar. 31, 2005

(30) Foreign Application Priority Data

Sep. 25, 2003  (JP) .................. 2003-334358

(51) Int. Cl.
 *A63F 9/24* (2006.01)
 *A63F 13/00* (2006.01)
 *G06F 17/00* (2006.01)
 *G06F 19/00* (2006.01)

(52) U.S. Cl. .............. 463/4; 463/3; 463/11; 463/40; 463/41; 702/183; 345/723; 345/724; 345/725; 345/719; 473/459

(58) Field of Classification Search .................. 463/4
See application file for complete search history.

(56) References Cited

U.S. PATENT DOCUMENTS

| | | | | |
|---|---|---|---|---|
| 4,645,206 A * | 2/1987 | Todd | ............... | 473/468 |
| 5,695,401 A | 12/1997 | Lowe et al. | | |
| 5,863,248 A * | 1/1999 | Mine et al. | ............ | 463/4 |
| 6,149,520 A | 11/2000 | Takatsuka | | |
| 6,280,323 B1 * | 8/2001 | Yamazaki et al. | ........... | 463/4 |
| 6,765,726 B2 * | 7/2004 | French et al. | ........... | 359/630 |
| 6,833,849 B1 * | 12/2004 | Kurokawa et al. | ........... | 715/723 |
| 7,051,022 B1 * | 5/2006 | Faisal | ............... | 707/5 |
| 7,110,998 B1 * | 9/2006 | Bhandari et al. | ........... | 707/4 |
| 2002/0165697 A1 * | 11/2002 | Min | ................ | 702/183 |

(Continued)

FOREIGN PATENT DOCUMENTS

EP    0 972 549 A1    1/2000

(Continued)

OTHER PUBLICATIONS

Dengeki PlayStation, Feb. 28, 2003, vol. 9, No. 6, p. 120, 121, Media Works Inc.

(Continued)

*Primary Examiner* — Paul A. D'Agostino
(74) *Attorney, Agent, or Firm* — Sughrue Mion, PLLC

(57) ABSTRACT

To provide a game device capable of evaluating and displaying progress in a more reliable manner in the case of implementing a soccer game or basketball game etc., there is provided means for determining which team is in possession of the ball, means for acquiring the ball position and the position of the game character in possession of the ball as a possession position, progress variable updating means for executing processing to enable the progress variable to approach a prescribed first fixed value when the first team is in possession of the ball and the ball is within a first attacking preparation region common to part or all of the first region, and executing processing to increase the progress variable when the first team is in possession of the ball and the possession position is outside of the first attacking preparation region, and means for displaying a progress display image according to the progress variable.

8 Claims, 6 Drawing Sheets

U.S. PATENT DOCUMENTS

2002/0173350 A1* 11/2002 Kaneda .................... 463/3
2003/0130020 A1    7/2003 Bates et al.

FOREIGN PATENT DOCUMENTS

| EP | 1 155 718 A2 | 11/2001 |
| --- | --- | --- |
| JP | 10-113471 A | 5/1998 |
| JP | 2001-137536 A | 5/2001 |
| JP | 2002-315964 A | 10/2002 |
| TW | 374021 | 11/1999 |

OTHER PUBLICATIONS

Dengeki Games, Mar. 1, 2003, p. 169, Kadokawa Shoten Publishing Co. Ltd.

* cited by examiner

GAME DEVICE, GAME CONTROL METHOD AND INFORMATION STORAGE MEDIUM

BACKGROUND OF THE INVENTION

The present invention relates to a game device, a control method for a game and a program, and particularly relates to technology for implementing a ball game such as, for example, a soccer game or basketball game etc. with one or a plurality of game characters constituting a first team made to correspond to a first region, one or a plurality of game characters constituting a second team made to correspond to a second region, and a ball being arranged at a field provided with the first region and the second region, with the ball being made to move on the field, in such a manner that the ball is caused to move to within goals arranged at the first region or second region corresponding to the opposing team on a computer etc.

Degree of ball penetration for during the game is calculated in software for implementing a soccer game on a computer, and is used for reference displaying. The software determines which game character of which team is in possession of the ball during games, the penetration factor is calculated by adding up this time, and this is displayed.

The degree of ball penetration can frequently be used as one factor for determining which team is superior. However, the degree of ball penetration rises when possession of the ball takes place in defensive regions even if an attack does not take place. The degree of ball penetration and progress therefore do not always coincide, and this is therefore not always appropriate in progress analysis.

SUMMARY OF THE INVENTION

In order to resolve the aforementioned problems, the present invention provides a game device, game control method and program capable of evaluating and displaying progress in a more reliable manner in the case of implementing a soccer game or basketball game etc.

In order to resolve the aforementioned problems, a game device of the present invention, with one or a plurality of game characters constituting a first team made to correspond to a first region, one or a plurality of game characters constituting a second team made to correspond to a second region, and a ball being arranged at a field provided with the first region and the second region, with the ball being made to move on the field, for executing a ball game where the ball is caused to move to within goals arranged at the first region or second region corresponding to the opposing team, comprises means for storing progress variables expressing extent of superiority of the first team, means for determining which team is in possession of the ball, means for acquiring the ball position and the position of the game character in possession of the ball as a possession position, progress variable updating means for executing processing to enable the progress variable to approach a prescribed first fixed value when the first team is in possession of the ball and the ball is within a first attacking preparation region common to part or all of the first region, and executing processing to increase the progress variable when the first team is in possession of the ball and the possession position is outside of the first attacking preparation region, and means for displaying according to the progress variable.

Further, a control method for a game of the present invention for enabling games to function on a game device with one or a plurality of game characters constituting a first team made to correspond to a first region, one or a plurality of game characters constituting a second team made to correspond to a second region, and a ball being arranged at a field provided with the first region and the second region, with the ball being made to move on the field, for executing a ball game where the ball is caused to move to within goals arranged at the first region or second region corresponding to the opposing team, comprises a step of storing progress variables expressing extent of superiority of the first team, a step of determining which team is in possession of the ball, a step of acquiring the ball position and the position of the game character in possession of the ball as a possession position, a progress variable updating step of executing processing to enable the progress variable to approach a prescribed first fixed value when the first team is in possession of the ball and the ball is within a first attacking preparation region common to part or all of the first region, and executing processing to increase the progress variable when the first team is in possession of the ball and the possession position is outside of the first attacking preparation region and a step of displaying according to the progress variable.

Further, a program of the present invention, with one or a plurality of game characters constituting a first team made to correspond to a first region, one or a plurality of game characters constituting a second team made to correspond to a second region, and a ball being arranged at a field provided with the first region and the second region, with the ball being made to move on the field, for executing a ball game where the ball is caused to move to within goals arranged at the first region or second region corresponding to the opposing team, comprises instructions for causing a computer to function as means for storing progress variables expressing extent of superiority of the first team, means for storing progress variables expressing extent of superiority of the first team, means for determining which team is in possession of the ball, means for acquiring the ball position and the position of the game character in possession of the ball as a possession position, progress variable updating means for executing processing to enable the progress variable to approach a prescribed first fixed value when the first team is in possession of the ball and the ball is within a first attacking preparation region common to part or all of the first region, and executing processing to increase the progress variable when the first team is in possession of the ball and the possession position is outside of the first attacking preparation region, and means for displaying according to the progress variable. The computer may be, for example, a personal computer, a server computer, a household game, an office game, a mobile game, a mobile telephone, or a mobile information terminal, etc. The program may be stored on a computer-readable information storage medium such as, for example, a CD-ROM, DVD-ROM, memory card, or hard-disc, etc.

The game of the present invention is provided with a field, with a first region and second region being provided at the field. For example, compartment lines may be drawn at the center of the field, and first and second regions may be provided to the left and right via the compartment lines. The first team is made to correspond to the first region and the second team is made to correspond to the second region. Goals are arranged at each region. Further, each team is configured of one or a plurality of game characters, and these game characters are arranged at the field together with the ball. The game characters are then operated on the field in accordance with, for example, operations by the controller and computer algorithms and move the ball on the field, with both teams competing to move the ball into the goal arranged at the region corresponding to the opposing team. The aforementioned game may be configured, for example, as a soccer game or basketball game etc., and may be realized using so-called three-dimensional computer graphics or two-dimensional computer graphics.

In the present invention, variables expressing extent of superiority of the first team are stored. The progress variable, is, for example, numeric information of a prescribed range. It is then determined whether or not the team in possession of the ball is the first team or the second team. This determination can be easily implemented utilizing publicly-known technology taking conditions of, for example, the distance between the ball and each game character, the game character in possession of the ball up to this point, whether or not the ball is on the field, or whether or not each game character has come into contact with the ball in a valid manner, etc.

Further, in the present invention, the position of the ball on the field, and the position of the game character in possession of the ball are acquired as a possession position. When the ball is in the possession of the first team, if the ball is within a first attacking preparation region set at the field with the possession position being in common with part or all of the first region, processing is executed to ensure that the progress variable approaches a prescribed first fixed value. Further, if the possession position is outside of the first attacking preparation region, processing is executed to increase the progress variable. Displaying is then carried out according to the progress variable.

According to the present invention, when the first team is in possession of the ball, if the possession position is within the first attacking preparation region, the progress variable approaches a first fixed value. Further, if the first team is in possession of the ball and the possession position is outside of the first attacking preparation region, the progress variable is increased. When game characters constituting the first team remain in possession of the ball and are in the first attacking preparation region sharing part of all of the first region (partially or completely overlapping), the progress variable expressing the degree of superiority of the first team converges on a first fixed value, and the progress of the game can be more accurately evaluated and indicated.

In an aspect of the present invention, the progress variable updating means executes processing to enable the progress variable to approach a prescribed second fixed value the same as or differing from the first fixed value when the second team is in possession of the ball and the ball is within the second attacking preparation region common to part or all of the first region, and executes processing to reduce the progress variable when the second team is in possession of the ball and the possession position is outside of the second attacking preparation region. According to this, when the second team is in possession of the ball, if the possession position is within the first attacking preparation region, the progress variable approaches a second fixed value. Further, if the possession is outside of the second attacking preparation region, the progress variable approaches that expressing that the second team is superior. When game character constituting the second team remain in possession of the ball and are in the second attacking preparation region sharing part of all of the second region (partially or completely overlapping), the progress variable expressing the degree of superiority of the first team converges on a second fixed value, and the progress of the game can be more accurately evaluated and indicated.

Further, in an aspect of the present invention, the game is a soccer game. The progress of the soccer game can therefore be evaluated in a more accurate manner and this may then be displayed.

Further, the first attacking preparation region may also be the same region as the first region. Similarly, the second attacking preparation region may also be the same region as the second region.

Moreover, in an aspect of the present invention, the progress variable has a maximum value and a minimum value, and the first fixed value and the second fixed value are both set to be intermediate values of the maximum value and the minimum value. In doing this, if one team keeps possession of the ball but stays in the attacking preparation region corresponding to this team, the progress variable shows that it cannot be said that either team is superior.

Further, in an aspect of the present invention, the progress variable updating means contains means for increasing and decreasing the progress variable according to the occurrence of a prescribed event if the prescribed event occurs when the ball is in the possession of the first team or the second team. In doing so, it is possible to evaluate the game conditions and display these in a more accurate manner.

Further, an aspect of the present invention further comprises past progress variable storage means for storing a prescribed number of current values for the progress variable every prescribed time and comparison display means for displaying images in order of storage to the past progress variable storage means according to each progress condition stored in the past progress variable storage means in comparison manner. In doing so, it is possible to display changes in progress in a manner that is easy to understand.

DESCRIPTION OF THE PREFERRED EMBODIMENT

The following is a detailed description based on the drawings of a preferred embodiment of the present invention.

Figure 1:
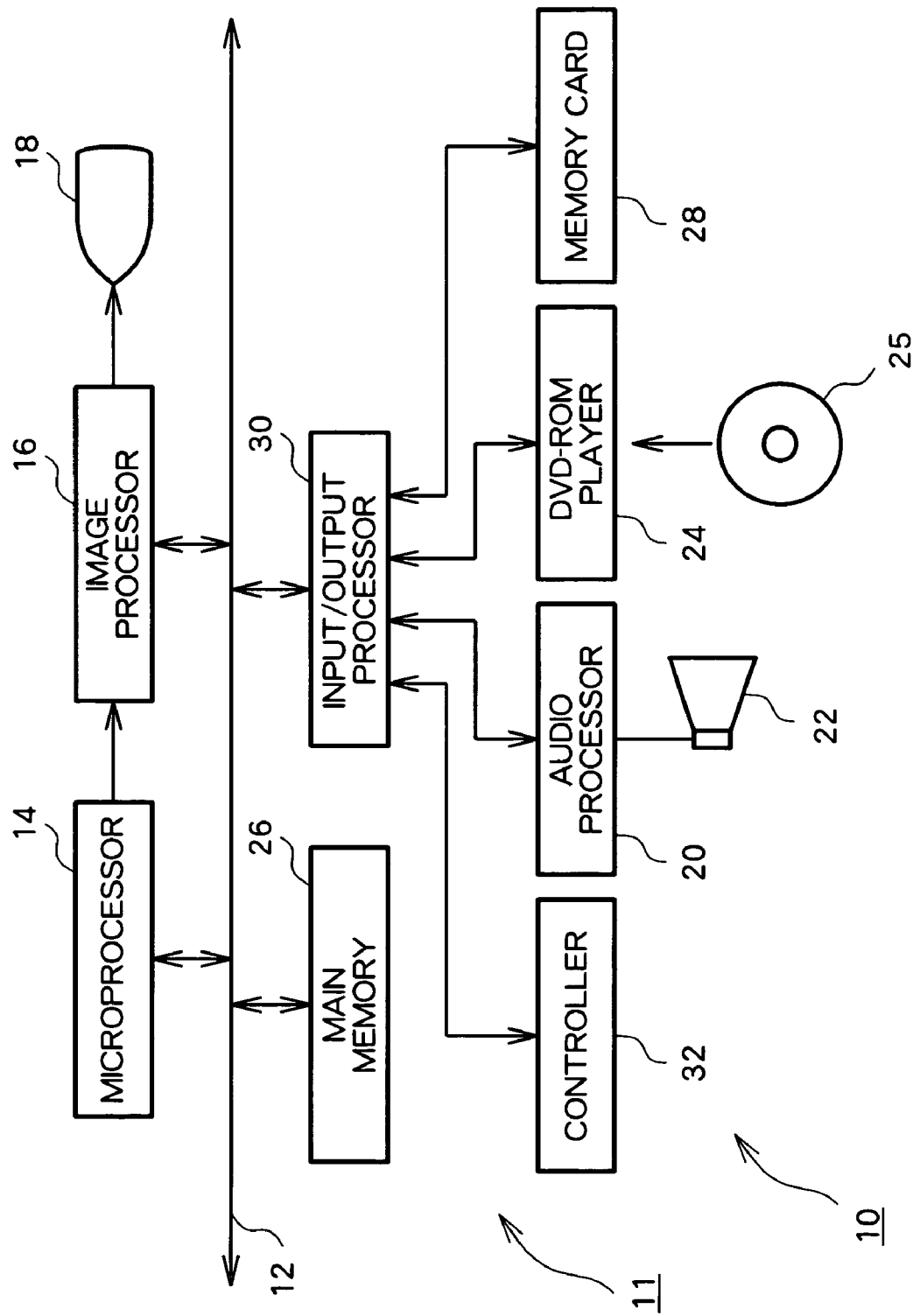
FIG. 1 is a view showing a hardware configuration for a game device of an embodiment of the present invention.

FIG. 1 is a view showing a hardware configuration for a game device of an embodiment of the present invention. The game device 10 of FIG. 1 is installed with a DVD-ROM 25 and memory card 28 constituting information storage media at the household game 11 and a monitor 18 and speaker 22 are connected. A household television is used as the monitor 18 with built-in speakers of the television used as the speakers 22. Further, a DVD-ROM 25 is used to supply the program to the household game 11 but any other information storage media such as CD-ROMs or ROM cards etc. may also be used. Moreover, the program may also be supplied to the household game 11 from a remote location via a data communication network such as the Internet, etc.

The household game 11 is a well-known computer game system including a microprocessor 14, image processor 16, main memory 26, input/output processor 30, audio processor 20, controller 32, and DVD-ROM player 24. The microprocessor 14, image processor 16, main memory 26, and input/output processor 30 are connected so as to be capable of mutual data communication using a bus 12, with the controller 32, audio processor 20, DVD-ROM player 24 and memory card 28 being connected to the input/output processor 30. Each configuration element of the household game 11 other than the controller 32 is housed in a case.

The microprocessor 14 controls each part of the household game 11 based on an operating system housed in a ROM (not shown), a program read from the DVD-ROM 25, and saved data read from the memory card 28, and provides the game to the player. The bus 12 is for exchanging addresses and data with each part of the household game 11. The main memory 26, for example, has a configuration including RAM, which is written with programs read out from the DVD-ROM 25 and saved data read out from the memory card 28 as necessary. The main memory 26 can also be used in operations of the microprocessor 14 for work space. The image processor 16 has a configuration including VRAM. The image processor 16 receives image data sent from the microprocessor 14, depicts this as a game image on the VRAM based on this, and converts this content to a video signal for output at the monitor 18 at a prescribed timing.

The input/output processor 30 is an interface enabling the microprocessor 14 to access the controller 32, the audio processor 20, the DVD-ROM player 24, and the memory card 28. The audio processor 20 includes a sound buffer and reads out various audio data such as game music, game effect sounds, and messages etc. from the DVD-ROM 25 and plays back these sounds from the speaker 22. The DVD-ROM player 24 reads programs recorded on the DVD-ROM 25 in accordance with instructions from the microprocessor 14. The controller 32 is a general-purpose operation input means for enabling a player to input various game operations. The memory card 28 includes non-volatile memory (for example, EEPROM) and is detachable from the household game 11. Saved data for various games etc. is stored in the memory card 28.

A description is now given of technology for displaying the progress of a soccer game constituting a computer game using a game device 10 have the above configuration.

Figure 2:
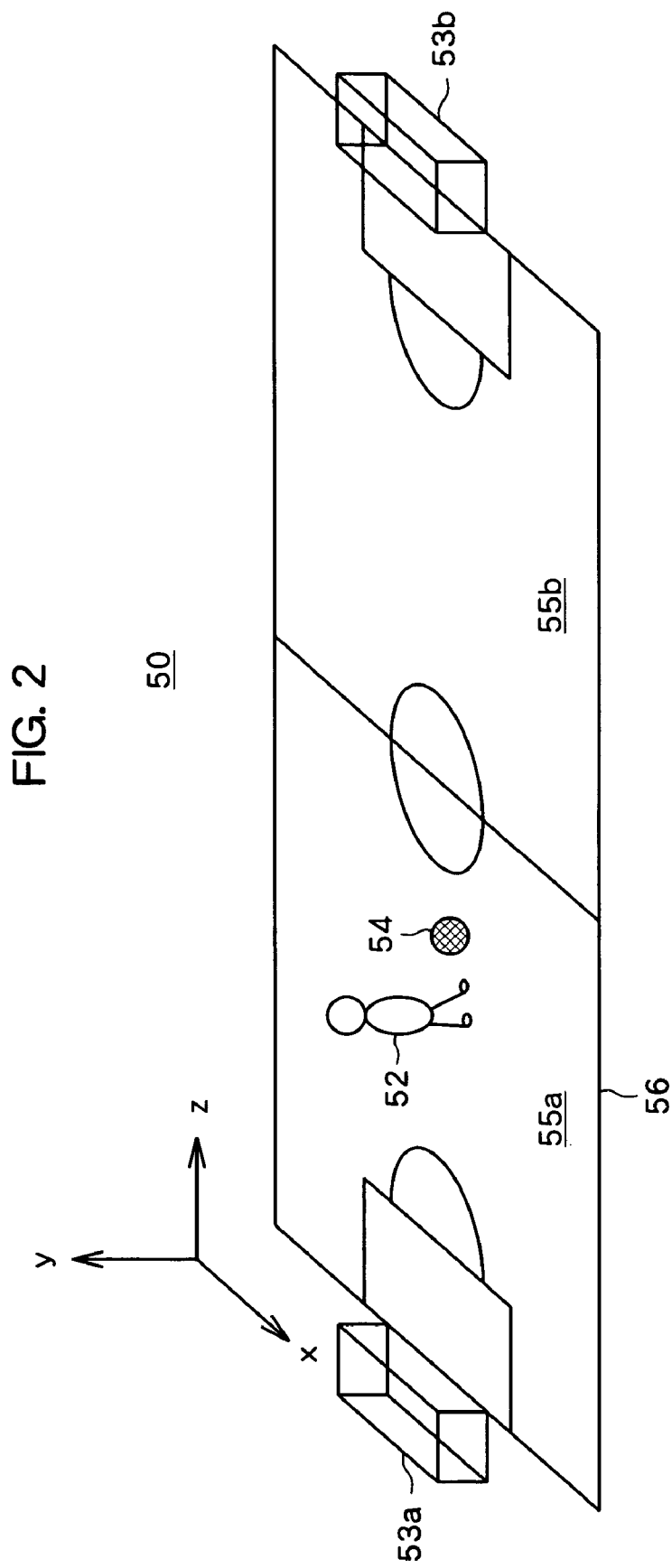
FIG. 2 is a perspective view showing a virtual three-dimensional space.

FIG. 2 is a view showing an example of virtual three-dimensional space constructed in a main memory 26 for the game device 10 of this embodiment. At the game device 10, a soccer game program is stored in the DVD-ROM 25, and the soccer game is provided at the game device 10 as a result of a microprocessor 14 executing the program. As shown in FIG. 2, a soccer field object 56 is arranged in the virtual three-dimensional space 50 constructed in the main memory 26 at the game device 10, and a plurality of soccer player objects (game character objects) 52 and a soccer ball object 54 are arranged on the soccer field object 56. Similarly, only one soccer player object 52 is shown in FIG. 2 but in reality twenty-two soccer player objects 52 are arranged in the virtual three-dimensional space 50, with eleven belonging to (corresponding to) a first team and the remaining eleven players belonging to (corresponding to) a second team.

The soccer field object 56 is a rectangular plane-shaped object, depicted to the left and right from the center. Here, the left side is a first region 55a and the right side is a second region 55b. A goal object 53a is provided at an end of the first region 55a, and a goal object 53b is provided at an end of the second region 55b. The first region 55a and the goal object 53a correspond to the first team. Further, the second region 55b and the goal object 53b correspond to the second team. In this soccer game, each soccer player object 52 is then made to play soccer on the soccer field object 56 in accordance with operation signals inputted using the controller 32 or in accordance with instructions given by the microprocessor 14. Both teams then compete to move the ball object 54 into the goal objects 53a or 53b corresponding to that of the opposing team.

Figure 3:
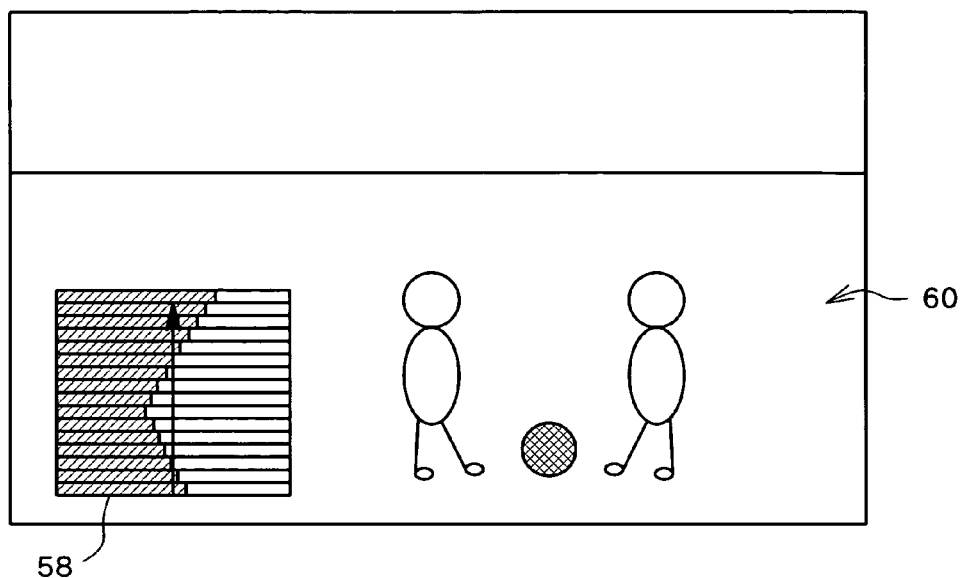
FIG. 3 is a view showing an example of a game screen.

A viewpoint (not shown) is set in the virtual three-dimensional space 50, and the game device 10 puts the situation of the virtual three-dimensional space 50 as viewed from this viewpoint in the form of an image and displays this on the monitor 18. FIG. 3 shows an example of a game screen displayed in this manner. As shown in FIG. 3, a situation is shown where soccer player objects 52 on a soccer field object 56 arranged in the virtual three-dimensional space 50 play soccer is displayed on a game screen 60, with a progress display image 58 being displayed at the lower left of the game screen 60.

Figure 4:
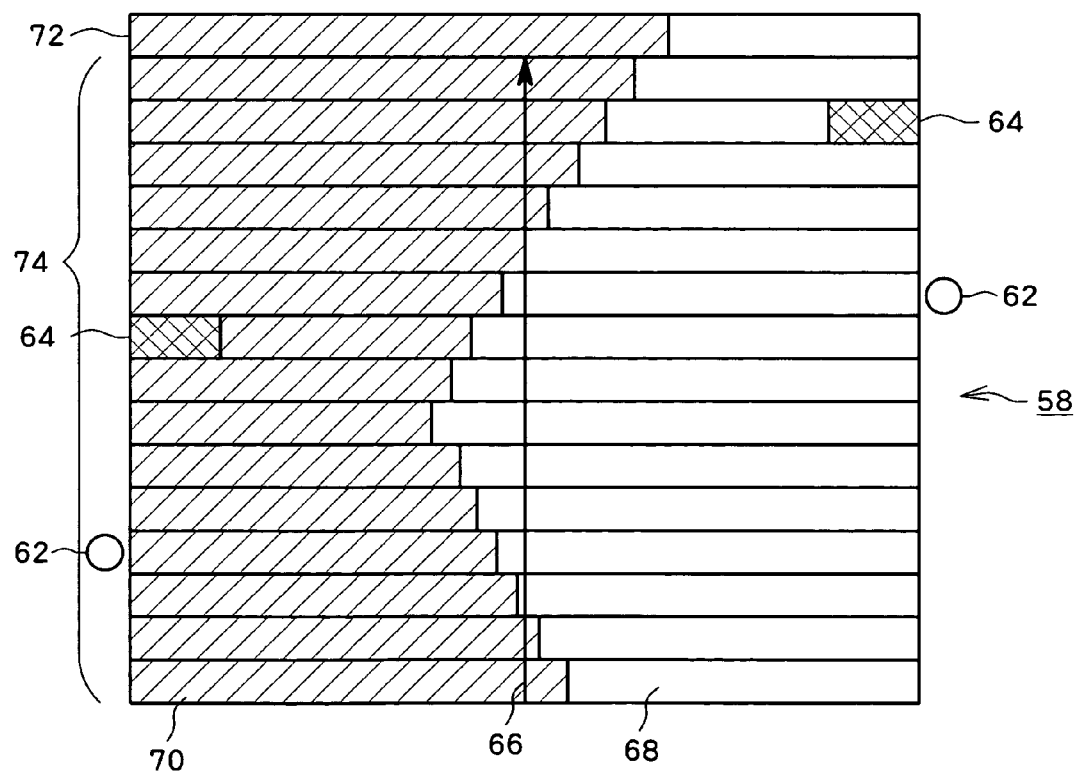
FIG. 4 is a view showing an enlarged progress display image.

As shown in an enlarged manner in FIG. 4, the progress display image 58 contains fifteen graphical images 74 that are strips of the same shape and size extending in a horizontal direction of the screen. The graphical images 74 are arranged with their long sides connecting to each other and with their left and right ends coinciding, and express progress for a certain one minute of soccer carried out in respective virtual three-dimensional spaces 50. Specifically, each graphical region 74 is formed of two regions where the display conditions such as color etc. are different to the left and right, with the length of a region (here, the hatched region) 70 of one display state indicating the extent of superiority of the first team. Further, the length of a region (here, the whited out region) 68 for another display situation showing the extent to which the second team is superior. When the length of both regions is the same, regions for which the display conditions are different are formed to the left and right from the centers of the graphical images 74. In this case, neither the first team nor the second team can be said to be superior. The graphical images 74 are arranged from the lower side to the upper side in order of graphical images 74 expressing the oldest state of progress. At the progress display image 58, an arrow image 66 for displaying a direction for the passage of time is displayed at a position crossing at a central position of each graphical image 74.

Further, regions 64 for which the display conditions are still different are formed at the left and right end of one part of a graphical image 74. In the case where a region 64 is formed at a left end, this shows that processing for a tactical change relating to the first team is carried out at a time zone corresponding to this graphical image 74. Further, in the case where a region 64 is formed at a right end, this shows that processing for a tactical change relating to the second team is carried out at a time zone corresponding to this graphical image 74.

Further, a score marker image 62 is arranged at the left side and right side of a part of the graphical images 74. When this score marker image 62 is displayed, it is displayed that there has been a goal at the time zone corresponding to a graphical image 74 arranged to the side of this image. Specifically, when the marker 62 is displayed at the left side of the graphical image 74, this indicates that the first team has scored a goal at the time zone corresponding to this graphical image 74. When the marker 62 is displayed at the right side of the graphical image 74, this indicates that the second team has scored a goal at the time band corresponding to this graphical image 74.

Further, at the upper side of the graphical image 74, a strip-shaped current graphical image 72 of the same shape and size as each graphical image 74 is arranged at the upper side of the graphical images 74 so as to come into contact with the long edge of the uppermost graphical image 74 and coincide with the left and right edges.

The following is a specific description of processing for displaying the progress display image 58 described above on a monitor 18 for a soccer game.

Figure 5:
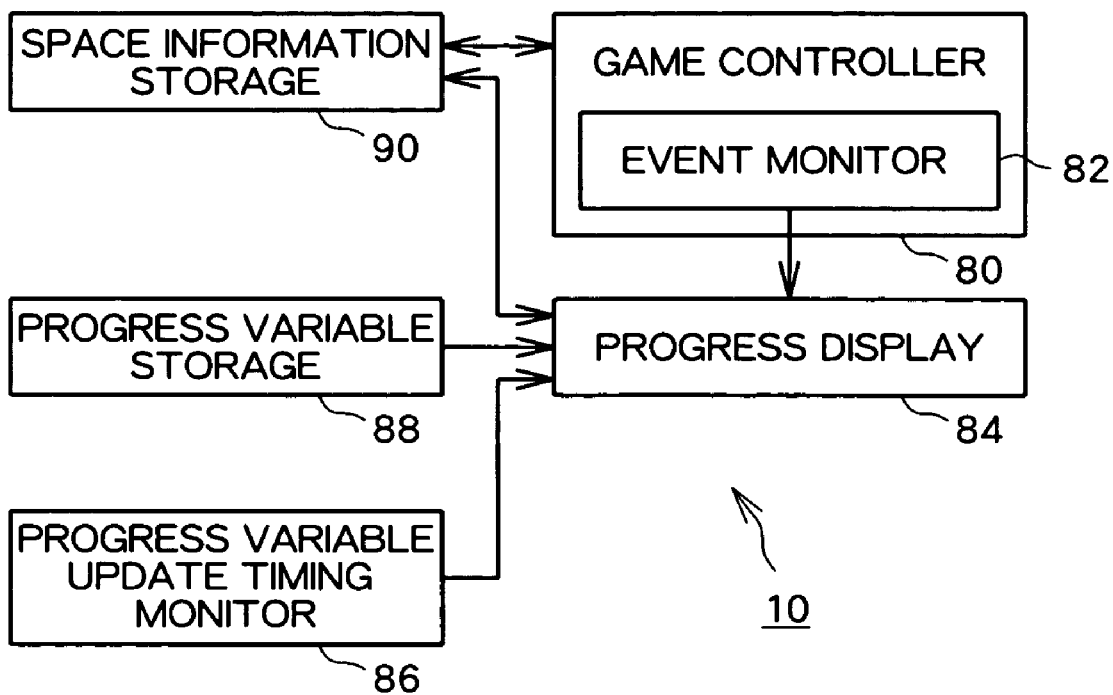
FIG. 5 is a block view showing functions of a game device of the embodiment of the present invention.

FIG. 5 is a functional block view showing the relationship between each software function implemented by the game device 10. FIG. 5 is a view centering on those functions of the functions implemented by the game device 10 that relate to the present invention. These functions are implemented as a result of programs stored on a DVD-ROM 25 being executed on household game 11 constituting a computer system.

As shown in FIG. 5, space information storage 90, progress variable storage 88, a progress variable update timing monitoring section 86, a game controller 80 and a progress display section 84 are contained in functions executed using the game device 10. An event monitoring section 82 is also contained in the game controller 80. First, the space information storage 90 is configured so as to contain storage means such as a DVD-ROM 25 and main memory 26 etc. and stores various types of data indicating the state of the virtual three-dimensional space 50. This stores the current position and posture of each soccer player object 52, the position of the ball object 54, the goals the first team and second team have up to present point, information identifying the soccer player object 52 currently in possession of the ball object 54 and the team to which this soccer player object belongs, and whether or not a match is in progress.

The game controller 80 implements the soccer game and displays a game screen (FIG. 3 etc.) for the soccer game on the monitor 18 based on storage content of the space information storage 90 and operation signals inputted by the controller 32. Further, the game controller 80 updates storage content of the space information storage 90. An event monitoring section 82 in particular contains the game controller 80. The event monitor 82 monitors the occurrence of events such as the case where one of the teams scores a goal, the case where processing in order to change tactics relating to one of the teams, or the case where one of the teams shoots (the case where the ball object 54 is kicked strongly towards the goal object 53*a* or 53*b* in accordance with an operation of a soccer player object 52 belonging to one of the teams) or centers (the case where a soccer player object 52 belonging to one of the teams kicks the ball object 54 a long way towards the front of the goal object 53*a* or 53*b* corresponding to the opposing team from a corner of the first region 55*a* or the second region 55*b* corresponding to the opposing team), and gives notification to the progress display section 84 when one of these events occurs.

Figure 6:
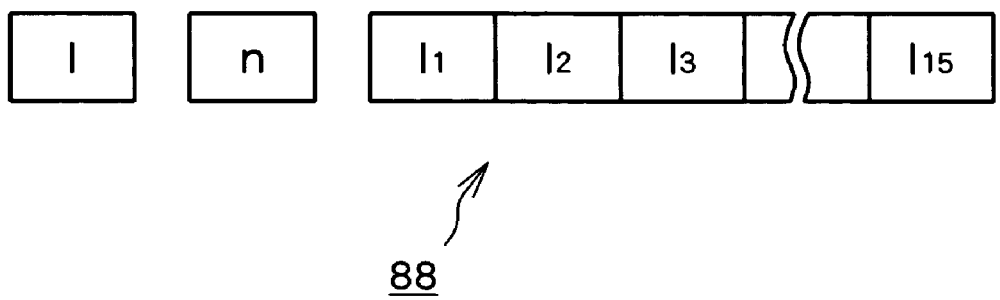
FIG. 6 is a view showing storage content of the progress variable storage.

The progress variable storage 88 contains storage means such as the main memory 26, etc., and stores progress variables indicating extent of superiority of the first team in the soccer game. The progress variables are numerical data having a range of 0 to 100. FIG. 6 is a view showing storage content of the progress variable storage 88. As shown in FIG. 6, the progress variable storage 88 specifically stores a progress variable I corresponding to a current graphical image 72, past progress variables I1 to I15 duplicating and storing progress variables I every one minute, and a numerical value n identifying which of the past progress variables I1 to I15 is finally stored. The past progress variables I1 to I15 are used to determine lengths of the regions 70 of each graphical image 74. Further, a numerical value n is used to determine the order of arrangement of the graphical images 74. Further, the progress variable I is used to determine the length of the region 70 of the current graphical image 72.

Returning to FIG. 5, the progress variable update timing monitoring section 86 is for monitoring timing of updating the progress variable I. With this game device 10, in principle (with the exception of updating according to the occurrence of a prescribed event), updating of the progress variable I is limited to being every prescribed period of time. As a result, the progress variable update timing monitoring section 86 monitors progress variable update timing decided in advance every ten seconds. The progress display section 84 generates the progress display image 58 based on notification content from the event monitor 82, storage content of the space information storage 90, and monitoring conditions at the progress variable update timing monitoring section 86 and displays this on the monitor 18.

Figure 7:
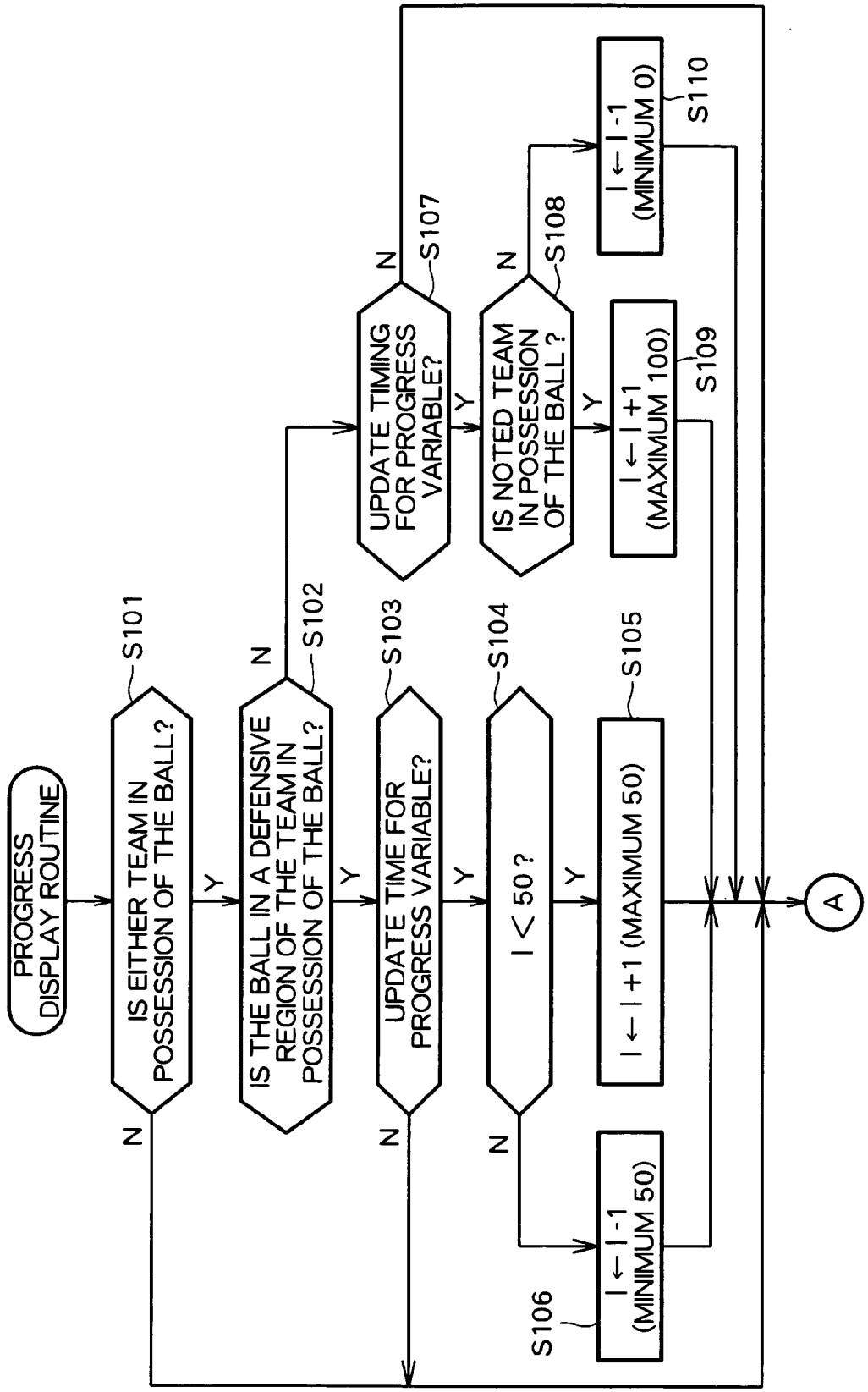
FIG. 7 is a flowchart showing progress display processing for the first embodiment of the present invention.
Figure 8:
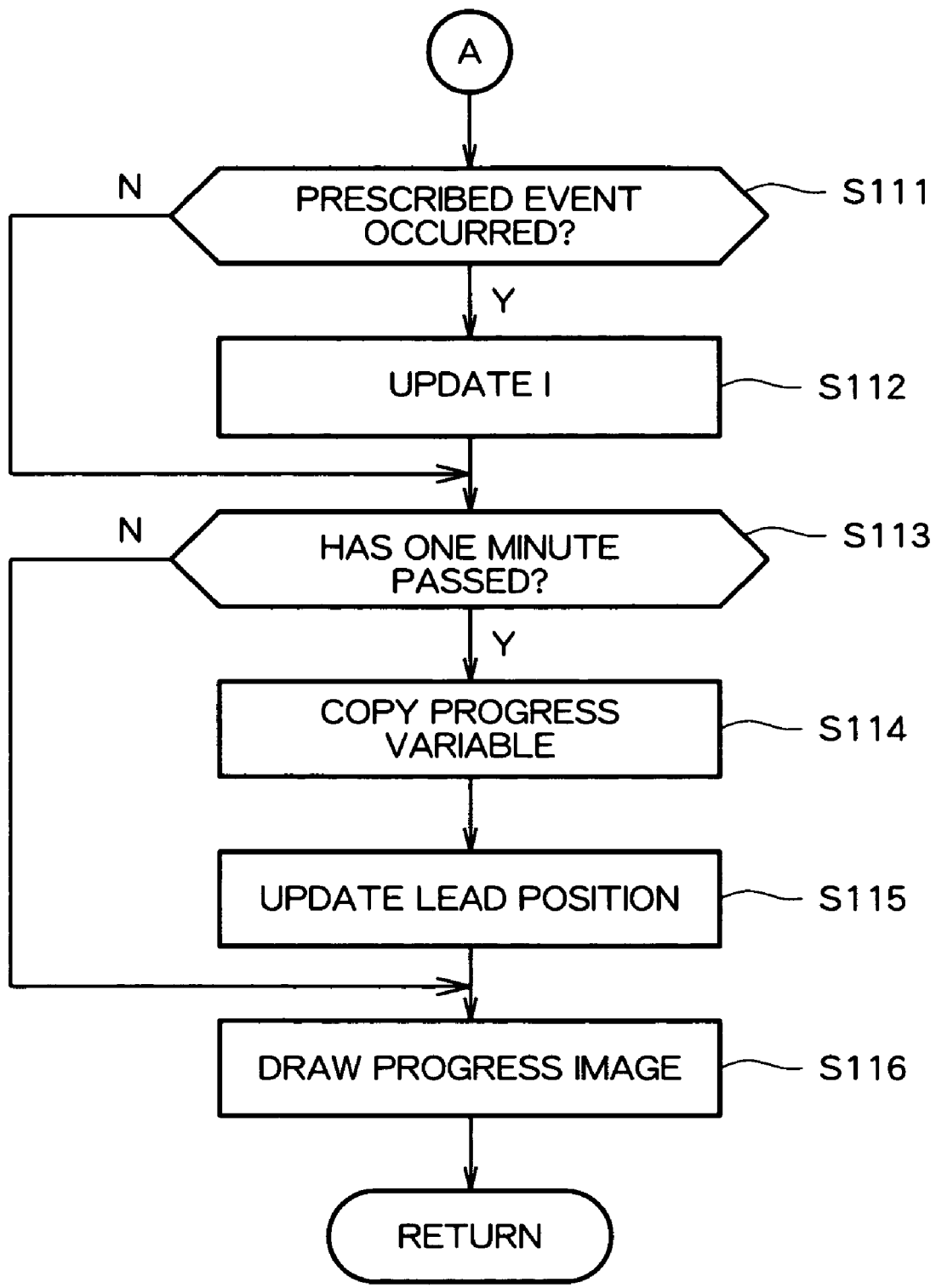
FIG. 8 is a further flowchart showing progress display processing for the first embodiment of the present invention.

FIG. 7 and FIG. 8 are flowcharts illustrating the details of processing of the progress display section 84. The processing shown in FIG. 7 and FIG. 8 is executed at prescribed times (for example, every ¹⁄₆₀ seconds) based on the program stored in the DVD-ROM 25.

As shown in FIG. 7, at the progress display section 84, first, a determination is made as to whether or not either team is in possession of the ball object 54 (S101). Which soccer payer object 52 of which team is currently in possession of the ball object 54 is stored in the space information storage 90, and together with this information, the progress display section 84 determines which team is currently in possession of the ball object 54. It is possible to determine which team is currently in possession of the ball object 54 in a straightforward manner using publicly known technology by taking conditions such as, for example, distance between the ball object 54 and each soccer player object 52, the soccer player object 52 in possession of the ball object unit 54 until immediately before, whether or not the ball object 54 is within the soccer field object 56, and whether or not each soccer player object 52 effectively comes into contact with the ball object 54.

When it is determined that neither team is in possession of the ball object 54, S111 is proceeded to. On the other hand, when it is determined that one or other of the teams is in possession of the ball object 54, next, the possession position of the ball object 54 is acquired, and a determination is made as to whether or not the possession position is within an attacking preparation region (the first region 55*a* or the second region 55*b*) corresponding to the team in possession of the ball object 54 (S102). Here, the attacking preparation region is taken to be the region of the first region 55*a* or the second region 55*b* corresponding to the team, i.e. the defensive region of that team. The possession position of the ball object 54 may be, for example, the current position of the ball object 54, or may be the current position of the soccer payer object 52 in possession of the ball object 54. This data may also be read from the space information storage 90.

If there is then a possession position with a region corresponding to the team in possession of the ball object 54, a determination is made as to whether or not the current time is the update time for the progress variable I using the progress variable update timing monitoring section 86 (S103). If this is the update timing, a determination is made as to whether or not the progress variable I is less than 50 (S104). If the progress variable I is less than 50, 1 is added to the progress variable I, and the storage contents of the progress variable storage 88 are updated (S105). Further, if the progress variable I is 50 or more, 1 is subtracted from the progress variable I, and the storage content of the progress variable storage 88 is updated (S106). If the progress variable I is 50, this calculation is not carried out.

On the other hand, in S102, when it is determined that the ball object 54 is not within an attacking preparation region, a determination is then made as to whether or not the current time is the update time for the progress variable I. If the current time is the update timing, S108 to S110 are skipped, and S111 is gone to. On the other hand, if the current time is the update timing, a determination is made as to whether the noted team (which is the first team here) is in possession of the ball object 54, or the team opposing the noted team (which is the second team here) is in possession of the ball object 54 (S108). When the noted team is in possession of the ball object 54, 1 is added to the progress variable I, the storage content of the progress variable storage 88 is updated, and S111 is gone to. If the progress variable I has reached 100, this calculation is not carried out. Conversely, when the noted team is not in possession of the ball object 54, 1 is subtracted from the progress variable I, the storage content of the progress variable storage 88 is updated, and processing advances to S111. If the progress variable I is 0, this calculation is not carried out.

Next, FIG. 8 is proceeded to, and the progress display section 84 determines whether or not notification of the occurrence of a prescribed event has been given by the event monitoring section 82 (S111). If a prescribed event has occurred, the progress variable I is updated using a prescribed method (S112). For example, when an event occurs where the first team takes aim at the goal of the second team and shoots, the progress variable I is increased by a prescribed value, and the storage content of the progress variable storage 88 is updated. Further, for example, when an event occurs where the second team takes aim at the goal of the first team and shoots, the progress variable I is reduced by a prescribed value, and the storage content of the progress variable storage 88 is updated. Moreover, when, for example, the ball object 52 is positioned outside of the soccer field object 56, in the case of a player substitution, or when there is a foul (illegal conduct) etc., processing is carried out so that the progress variable I approaches 50. If a prescribed event has not occurred, S112 is skipped.

Next, it is determined whether or not one minute has passed since the last time when the progress variable I is copied to any one of the past progress variables 11 to 115 (S113). If one minute has passed, the progress variable I is copied to the numerical value N in the past progress value 11 to 115 which is judged to store the oldest progress condition (S114). This numerical value n is then updated with that specifying this copied past progress variable (S115). If one minute has not elapsed, the above processing is skipped.

After this, the progress display image 58 is generated in accordance with the storage content of the progress variable storage 88, and this is depicted in VRAM provided at the image processor 16 (S116). The image depicted in the VRAM is then converted to a video signal and outputted to the monitor 18. The progress display image 58 displayed at the game screen is then updated at prescribed time periods.

According to the game device 10 described above, when the first team is in possession of the ball object 54, if the possession position is within the first attacking preparation region, the progress variable I approaches 50. Further, if the first team is in possession of the ball and the possession position is outside of the first attacking preparation region, the progress variable I is increased. When game character object 52 constituting the first team remain in possession of the ball object 54 and are in the first attacking preparation region sharing part or all of the first region (partially or completely overlapping), the progress variable I expressing the degree of superiority of the first team converges on 50, and the progress of the game can be more accurately evaluated and displayed. Further, a prescribed number (15) of current values for the progress variable I are stored every minute, and each graphical image 74 is compared and displayed at the progress display image 58 in order of storage according to the stored progress variables. This means that changes in progress can be displayed in a manner that is easy to understand.

The present invention is by no means limited to the above embodiment. For example, in the above description, a description is given of an example of the present invention applied to a soccer game, but the present invention may also be applied to ball games such as basketball games etc. Further, in the above description, in S104 to S106, the progress variable I converges on 50 but may also converge on another numerical value. Moreover, in the above description, the first attacking preparation region is taken to be the same as the first region, but may be a region different to the first region providing this region is a region is common to part of or all of the first region. The same also applies fro the second attacking preparation region.

What is claimed is:

1. A game device including executable game software defining a plurality of game characters constituting a first team made to correspond to a first region, a plurality of game characters constituting a second team made to correspond to a second region, and a ball being arranged at a field provided with the first region and the second region, with the ball being made to move on the field, for executing a ball game where the ball is caused to move to within goals arranged at the first region or second region corresponding to the opposing team, and at least one player-operable controller enabling at least one player to input game operation commands that are operative to control the movement of at least one game character, comprising:

means for storing a progress variable, comprising numerical data within a range of value, expressing an extent of superiority of the first team over the second team during computer-controlled game play;

means for determining which team is in possession of the ball during computer-controlled game play;

means for acquiring the ball position and the position of the game character in possession of the ball as a possession position during computer-controlled game play;

progress variable updating means for (1) executing processing to enable the progress variable to approach a prescribed fixed value when the first team is in possession of the ball and the ball is within a first attacking preparation region common to part or all of the first region during computer-controlled game play by selectively performing incrementing or decrementing, (2) executing processing to increase the progress variable when the first team is in possession of the ball and the possession position is outside of the first attacking preparation region during game play, (3) executing processing to enable the progress variable to approach the fixed value when the second team is in possession of the ball and the ball is within the second attacking preparation region common to part or all of the first region during the game play by selectively performing incrementing or decrementing, and (4) executing processing to reduce the progress variable when the second team is in possession of the ball and the possession position is outside of the second attacking preparation region during the game play; and means for displaying according to the progress variable relative superiority of said first team and said second team as periodically determined during computer-controlled game play, wherein the progress variable has a maximum value and a minimum value, and the fixed value is set to be an intermediate value between the maximum value and the minimum value.

2. The game device as disclosed in claim 1, wherein the game is a soccer game.

3. The game device as disclosed in claim 1, wherein the first attacking preparation region is the same region as the first region.

4. The game device as disclosed in claim 1, wherein the second attacking preparation region is the same region as the second region.

5. The game device as disclosed in claim 1, wherein the progress variable updating means contains means for increasing and decreasing the progress variable according to the occurrence of a prescribed event if the prescribed event occurs when the ball is in the possession of the first team or the second team.

6. The game device as disclosed in claim 1, wherein the game device further comprises:

past progress variable storage means for storing a prescribed number of current values for the progress variable every prescribed time; and comparison display means for displaying images in order of storage to the past progress variable storage means according to each progress condition stored in the past progress variable storage means in a comparison manner.

7. A control method for a game for enabling games to function on a game device including executable game software defining a plurality of game characters constituting a first team made to correspond to a first region, a plurality of game characters constituting a second team made to correspond to a second region, and a ball being arranged at a field provided with the first region and the second region, with the ball being made to move on the field, for executing a ball game where the ball is caused to move to within goals arranged at the first region or second region corresponding to the opposing team, and at least one player-operable controller enabling at least one player to input game operation commands that are operative to control the movement of at least one game character, comprising:

a step of storing a progress variable, comprising numerical data within a range of value, expressing an extent of superiority of the first team during computer-controlled game play;

a step of determining which team is in possession of the ball during game play;

a step of acquiring the ball position and the position of the game character in possession of the ball as a possession position during computer-controlled game play;

a progress variable updating step of (1) executing processing to enable the progress variable to approach a prescribed fixed value when the first team is in possession of the ball and the ball is within a first attacking preparation region common to part or all of the first region during game play during computer-controlled game play by selectively performing incrementing or decrementing, (2) executing processing to increase the progress variable when the first team is in possession of the ball and the possession position is outside of the first attacking preparation region during computer-controlled game play; (3) executing processing to enable the progress variable to approach the fixed value when the second team is in possession of the ball and the ball is within the second attacking preparation region common to part or all of the first region during computer controlled game play by selectively performing incrementing or decrementing, and (4) executing processing to reduce the progress variable when the second team is in possession of the ball and the possession position is outside of the second attacking preparation region during computer-controlled game play: and a step of displaying according to the progress variable relative superiority of said first team and said second team as periodically determined during computer-controlled game play, wherein the progress variable has a maximum value and a minimum value, and the fixed value is set to be an intermediate value between the maximum value and the minimum value.

8. A non-transitory information storage medium readable by a computer and storing a program for causing a computer to function so as to execute a game that defines a plurality of game characters constituting a first team made to correspond to a first region, a plurality of game characters constituting a second team made to correspond to a second region, and a ball being arranged at a field provided with the first region and the second region, with the ball being made to move on the field, for executing a ball game where the ball is caused to move to within goals arranged at the first region or second region corresponding to the opposing team and responds to at least one player-operable controller enabling at least one player to input game operation commands that are operative to control the movement of at least one game character, wherein the computer functions as:

means for storing a progress variable, comprising numerical data within a range of value, expressing an extent of superiority of the first team during computer-controlled game play;

means for determining which team is in possession of the ball during computer-controlled game play;

means for acquiring the ball position and the position of the game character in possession of the ball as a possession position during computer-controlled game play;

progress variable updating means for (1) executing processing to enable the progress variable to approach a prescribed fixed value when the first team is in possession of the ball and the ball is within a first attacking preparation region common to part or all of the first region during computer-controlled game play by selectively performing incrementing or decrementing, (2) executing processing to increase the progress variable when the first team is in possession of the ball and the possession position is outside of the first attacking preparation region during computer-controlled game play, (3) executing processing to enable the progress variable to approach the fixed value when the second team is in possession of the ball and the ball is within the second attacking preparation region common to part or all of the first region during computer-controlled game play by selectively incrementing or decrementing, and (4) executing processing to reduce the progress variable when the second team is in possession of the ball and the possession position is outside of the second attacking preparation region during computer-controlled game play: and means for displaying according to the progress variable relative superiority of said first team and said second team as periodically determined during computer-controlled game play, wherein the progress variable has a maximum value and a minimum value, and the fixed value is set to be an intermediate value between the maximum value and the minimum value.

* * * * *